(12) United States Patent
Niemann

(10) Patent No.: US 11,215,199 B2
(45) Date of Patent: Jan. 4, 2022

(54) FAN UNIT HAVING A PLURALITY OF DAMPING ELEMENTS ARRANGED BETWEEN AIR GUIDE TUBE AND FAN GRATE

(71) Applicant: ELEKTROSIL GMBH, Hamburg (DE)

(72) Inventor: Hendrik Niemann, Rosengarten (DE)

(73) Assignee: ELEKTROSIL GMBH, Hamburg (DE)

( * ) Notice: Subject to any disclaimer, the term of this patent is extended or adjusted under 35 U.S.C. 154(b) by 61 days.

(21) Appl. No.: 16/307,629

(22) PCT Filed: Mar. 22, 2017

(86) PCT No.: PCT/EP2017/056793
§ 371 (c)(1),
(2) Date: Dec. 6, 2018

(87) PCT Pub. No.: WO2017/211474
PCT Pub. Date: Dec. 14, 2017

(65) Prior Publication Data
US 2019/0301494 A1 Oct. 3, 2019

(30) Foreign Application Priority Data
Jun. 8, 2016 (DE) .......................... 202016103052.8

(51) Int. Cl.
*F04D 29/70* (2006.01)
*B60N 2/56* (2006.01)
(Continued)

(52) U.S. Cl.
CPC ........... *F04D 29/703* (2013.01); *B60N 2/565* (2013.01); *B60N 2/5657* (2013.01); *B60N 2/70* (2013.01);
(Continued)

(58) Field of Classification Search
CPC ...... F04D 29/668; F04D 29/703; F04D 29/60; F04D 29/601; F04D 29/602; F04D 29/603; B60N 2/5642
See application file for complete search history.

(56) References Cited

U.S. PATENT DOCUMENTS 5,641,340 A * 6/1997 Kagan .................... B01D 46/10
95/273
5,904,744 A * 5/1999 Kagan ................ B01D 46/0005
55/385.1
(Continued)

FOREIGN PATENT DOCUMENTS

DE 10010986 A1 * 3/2001 ........... B60N 2/5635
DE 102009044349 A1 5/2011
(Continued)

OTHER PUBLICATIONS

International Search Report dated Jun. 21, 2017 from corresponding PCT Patent Application No. PCT/EP2017/056793.

*Primary Examiner* — J. Todd Newton
*Assistant Examiner* — Cameron A Corday
(74) *Attorney, Agent, or Firm* — Grogan, Tuccillo & Vanderleeden LLP

(57) ABSTRACT

The invention relates to a fan unit, having an air guide tube and a fan grate, wherein an air channel is formed by the air guide tube and the fan grate is arranged over a first end opening of the air guide tube in order to protect a fan wheel that can be arranged within the air guide tube. In order to improve such a fan unit in such a way that vibrations can be reduced in a simple and effective manner, at least three damping elements are arranged between the air guide tube and the fan grate in order to reduce vibrations.

11 Claims, 4 Drawing Sheets

(51) Int. Cl.
  *B60N 2/70* (2006.01)
  *F04D 29/66* (2006.01)
(52) U.S. Cl.
  CPC ........ *F04D 29/668* (2013.01); *F05D 2240/14* (2013.01)

(56) References Cited

U.S. PATENT DOCUMENTS

| | | | | |
|---|---|---|---|---|
| 6,048,024 | A * | 4/2000 | Wallman | A47C 7/74 297/180.14 |
| 7,186,075 | B2 * | 3/2007 | Winkler | F04D 25/12 415/119 |
| 7,189,053 | B2 * | 3/2007 | Winkler | B29C 45/0062 415/108 |
| 2006/0138812 | A1 * | 6/2006 | Aoki | B60N 2/5642 297/180.14 |
| 2011/0101800 | A1 * | 5/2011 | Schiel | F04D 25/0606 310/51 |
| 2018/0022251 | A1 * | 1/2018 | Kienzler | B60N 2/565 297/180.12 |

FOREIGN PATENT DOCUMENTS

| | | |
|---|---|---|
| DE | 102010045899 B3 | 2/2012 |
| DE | 202012103921 U1 | 1/2014 |

\* cited by examiner

FAN UNIT HAVING A PLURALITY OF DAMPING ELEMENTS ARRANGED BETWEEN AIR GUIDE TUBE AND FAN GRATE

CROSS REFERENCE TO RELATED APPLICATIONS

This application is the national stage of International Application No. PCT/EP2017/056793 filed Mar. 22, 2017 which claims priority to German Patent Application No. 202016103052.8, filed Jun. 8, 2016, the entire contents of all of which are incorporated herein by reference in their entireties.

DESCRIPTION

The invention relates to a fan unit having an air duct tube and a fan grille. An air duct is formed by the air duct tube. The fan grille is arranged to protect a fan propeller which is arrangeable within the air duct tube above a first frontal opening of the air duct tube.

STATE OF THE ART

Fans or fan units are understood to mean ventilators in the following, in particular in the form of axial fans or radial fans. The fans or fan units consist of several separate components. Such fan units are usually used to cool an interior of computer housings or other electronic devices. Furthermore, such fan units are also used in the automotive industry, for example, for seat air conditioning. It is especially important to avoid vibrations and disturbing noises in such comfort applications. Axial fans and fans in general, however, usually have a production-related imbalance, which can lead to unwanted vibrations during operation of the fan. Disturbing noises and vibrations can also occur during operation due to motor and air flow noise of the fan. Such noise and vibration must be reduced and dampened, in particular in comfort applications.

Solutions are known in the prior art for improving the noise damping and reducing the vibration noise in fans, wherein the fan housing is connected by means of elastomeric links to the mounting housing.

For example, it is proposed in DE 10 2009 005 383 A1 to connect an air duct tube, through which the fan transports air during operation, to a suspension link made of an elastomeric material and to hang in a ring made of hard plastic. It is further provided that the ring holding the ventilation tube has a tubular extension made of soft plastic for the noise-damping connection of the fan unit to a carrier part. Such a tubular extension can be formed, for example, as a bellows and have a spring element having a predetermined oscillation behavior for vibration and noise damping.

In DE 10 2010 045 899 B3, a ventilator unit or fan unit is described with an improved design of the elastic suspension of an axial ventilator in a support ring. The improved design of the elastic suspension of the axial ventilator is used for damping oscillation and vibration noise.

Such a construction of a fan unit thus avoids having the air duct tube arranged in a mounting housing directly touching the inner wall of the mounting housing or being in direct contact with this. This is usually achieved by the provision of elastic connecting elements between the air duct tube and the mounting housing of the fan unit. The disadvantage is that air stream short circuits can occur during operation due to an air gap between the air duct tube and the mounting housing of the fan unit.

DE 10 2014 111 055 A1 describes a fan unit having an axial fan. The fan unit has an air duct tube, in which the axial fan is arranged, and an outer housing part which surrounds the air duct tube at least partially. A gap is formed between the air duct tube and the housing part. A guide element is further provided at the air duct tube to guide the fluid flowing through the gap and to at least partially constrict the gap.

PRESENTATION OF THE INVENTION: TASK, SOLUTION, ADVANTAGES

An object of the present invention is to further improve a fan unit having an air duct tube and a fan grille such that vibration can be reduced in a simple and effective manner.

A fan unit according to the invention having an air duct tube and a fan grille is proposed for this purpose. An air duct is formed by the air duct tube. The fan grille is used to protect a fan propeller which is arrangeable within the air duct tube and further components of the fan. The fan grille is arranged above a first frontal opening of the air duct tube for this purpose. It is to be understood that the fan grille essentially covers the first frontal opening of the air duct tube. However, the fan grille does not have to sit directly on the air duct tube.

To reduce the vibration, it is inventively provided that at least three damping elements are arranged between the air duct tube and the fan grille.

The fan unit is provided, in particular, for a ventilation device, for example, for seat ventilation of a vehicle seat. An air duct is formed by the air duct tube. The air flow is generated by a fan propeller which is arrangeable in the air duct tube. The fan unit can be formed as a radial fan or axial fan. Preferably, the fan unit is formed as axial fan.

A receiving region and preferably a socket for receiving a fan propeller is thus provided in the air duct tube.

The vibrations are reduced and not transmitted or only very slightly transmitted to the fan grille through the at least three damping elements between the air duct tube and the fan grille. Persons sitting on the vehicle seat thus no longer feel the vibrations generated by the fan unit with a seat ventilation device of a vehicle seat. Particularly preferably, more than three damping elements are arranged between the air duct tube and the fan grille.

Preferably, the damping elements have elastic material or consist of an elastic material. It is particularly preferably provided that the individual damping elements consist of a homogeneous material. Preferably, each of the damping elements is formed separately and integrally.

Furthermore, it is preferably provided that the damping elements are circumferentially distributed and arranged spaced from each other.

The fan grille is preferably arranged spaced from the air duct tube to form an annular gap between the air duct tube and the fan grille in the axial direction. The fan grille thus preferably does not bear directly on the air duct tube. The annular gap extends between the first frontal edge of the air duct tube and the fan grille.

Preferably, the damping elements are arranged at least in sections in the gap between the air duct tube and the fan grille. Due to the circumferential distribution of the damping elements, the gap is divided or interrupted in the circumferential direction by the individual damping elements. The damping elements thus project beyond the first frontal edge of the air duct tube and protrude into the annular gap in the axial direction.

Preferably, each individual damping element has a section with a spring effect in at least the axial direction. Particularly preferably, the section with the spring effect is arranged in the middle region of the damping element. The section with spring effect is therefore also referred as the middle section in the following. In this case, the section with the spring effect is formed such that the spring effect is formed at least in the axial direction, that is, in the Z-direction. Due to the spring effect, the damping element can be reversibly stretched and compressed in the axial direction in the region of the middle section.

A through hole is preferably arranged through the damping element to produce the spring effect in the section with spring effect. In this case, the through hole is formed particularly preferably elongated. It is to be understood that the through hole has a greater width than height. For example, the through hole can have an oval or rectangular shape.

Furthermore, it is preferably provided that a first plate-shaped or web-shaped section of the damping element adjoins the section with the spring effect, which plate-shaped or web-shaped section has a smaller width in an adjacent region than the section with the spring effect. It is understood that the first section of the damping element in the region in which it adjoins the middle section, that is, the section with spring effect, has a smaller width than the middle section, that is, the section with the spring effect. Particularly preferably, it is provided that the first section in this adjacent region also has a smaller width than the width of the through hole through the section with spring effect.

Particularly preferably, it is further provided that a second plate-shaped or web-shaped section of the damping element adjoins the section with spring effect, which plate-shaped or web-shaped section also has a smaller width than the section with spring effect in the adjacent region. In this case, the second section of the damping element is arranged opposite to the first section. It is understood that the section with spring effect, that is, the middle section, is arranged between the first section and the second section. Both adjacent sections can press against the middle section along an axial axis (for example, along the longitudinal center axis of a damping element) in opposite directions. Characterized in that the middle section (section with spring effect) is wider than the adjacent sections of the first section and the second section, opposite edges or webs, which surround the through hole through the middle section (section with spring effect) in regions, can be compressed. In this way, the damping element can be compressed in the middle region and expanded again when pulling apart. Both the expansion and the compression take place in the axial direction, that is, in the longitudinal direction of the damping element and thus in the Z-direction.

In principle, the damping elements can also have a spring effect in other directions, for example, in the X-direction or Y-direction. When using the fan unit in a vehicle seat, the fan unit can be inserted or pushed into the seat foam of the vehicle seat within the vehicle seat. The seat foam encloses the fan unit essentially in full. A certain spring effect is already provided in the X-direction and Y-direction by the seat foam circumferentially adjacent to the fan unit. This means that vibrations in the X-direction and Y-direction are already compensated for or damped by the seat foam. That means, however, that the seat foam cannot compensate for vibration or very slightly compensate for vibration in the Z-direction, that is, in the axial direction (with respect to the fan unit and the air flow). Thus, the damping elements at least have a spring effect in the Z-direction or in the axial direction.

Preferably, at least one of the damping elements has a first receiving means for receiving a first locking pin. Furthermore, this damping element preferably has a second receiving means for receiving a second locking pin. Particularly preferably, all damping elements each have two receiving means (a first and a second receiving means) for receiving two locking pins (a first and a second locking pin).

The receiving means can be recesses or through holes in the receiving means or through the receiving means. Furthermore, the receiving means are preferably arranged in the first section and/or in the second section of the damping element and thus not in the region of the section with spring effect. The first receiving means and the second receiving means are particularly preferably arranged on a longitudinal center axis of the damping element. In this case, both receiving means of a damping element are preferably spaced from each other and at equal intervals to the middle section, that is, arranged to the section with spring effect. If the section with spring effect is formed as a through hole, particularly preferably both receiving means are arranged at equal intervals to this through hole in the spring-like section.

The first locking pin is preferably arranged on the air duct tube, for example, projecting radially outwardly from an outer side (outer circumferential side) of the air duct tube. The second locking pin is then preferably arranged on the fan grille. The locking pins are used for locking or fastening the fan grille on the air duct tube. At the same time however, the two locking pins are also used for locking in the seat foam of a vehicle seat.

The first locking pin is preferably formed essentially hook-shaped. Alternatively or additionally, the second locking pin is preferably formed essentially block-shaped or cube-shaped. Both locking pins preferably have no undercuts. Most preferably, only the first locking pin, namely the locking pin on the air duct tube and not the second locking pin, namely the locking pin on the fan grille, is formed hook-shaped. When inserting the fan grille into the seat foam for placement on the air duct tube already arranged in the seat foam, the foam would be pressed downward and be hooked in a hook-shaped design of the second locking pin (that is, the locking pin on the fan grille). Taking out the fan grille would then no longer be possible without damaging the seat foam. In contrast, a hook-shaped configuration of the first locking pin (of the locking pin on the air duct tube) can be used for locking or fixing in the seat foam of the vehicle seat.

Preferably, the fan grille has an outer peripheral edge with radial recesses for receiving the damping elements. The outer circumferential edge is, for example, plate-shaped and formed as a circumferential flange and extends essentially in one plane with the grille of the fan grille. The grille of the fan grille is circumferentially enclosed by the peripheral edge. The peripheral edge is used for support on the seat foam in a vehicle seat.

Furthermore, it is preferably provided that the fan grille has grille legs projecting in the axial direction. These grille legs are arranged essentially perpendicular to the peripheral edge and extend from the end of the radial recesses in the peripheral edge perpendicularly downwards. The second locking pins can be arranged on the grille legs.

For the purposes of this invention, all locking pins on the air duct tube are understood to mean first locking pins and all locking pins on the fan grille to mean second locking pins.

A groove is preferably arranged in an outer side (outer circumferential side) of the air duct tube, wherein one of the damping elements is inserted in sections at least in regions in this groove. Preferably, a plurality of grooves is arranged in the outer side of the air duct tube, wherein in each case a groove of the damping elements is inserted in sections. In this case, the grooves are arranged in the longitudinal direction or axial direction. The depth of the groove particularly preferably corresponds essentially to the thickness of the damping element in the region of the first section. After insertion of the damping element into the groove, the damping element thus does not project radially in this region from the outer periphery of the air duct tube. Thus, only the first locking pins project radially from the outer side of the air duct tube. A groove can also be preferably arranged in the outer side of the grille legs of the fan grille, in which groove the damping element is inserted with its second sections.

Furthermore, the air duct tube preferably has a plurality of flanges projecting radially outwardly. Each flange extends particularly preferably radially outward, that is, essentially perpendicular to the circumferential outer side of the air duct tube. Each of these flanges is used to place the air duct tube on the seat foam. In each case, a flange is particularly preferably arranged between two damping elements.

According to the invention, a vehicle seat is further provided, which has at least one above-described fan unit for ventilation.

Seat foam is at least partially arranged in the vehicle seat, wherein the fan unit is preferably arranged within the vehicle seat such that the entire fan unit is circumferentially enclosed by the seat foam. As a result, the fan unit is mounted in the seat. Further, vibrations in the X-direction and Y-direction are dampened by the seat foam.

Furthermore, it is preferably provided that the seat foam is additionally arranged between the air duct tube and the fan grille of the fan unit and thus in the annular gap between fan grille and air duct tube. The air duct tube and the fan grille are thereby mounted independently of each other in the seat foam. After insertion, the seat foam fills up both parts of the fan unit, namely after insertion of the air duct tube and the fan grille, the regions between the frontal edge of the air duct tube and the peripheral edge section of the fan grille. Thus, the annular gap between the air duct tube and the fan grille is essentially closed by the seat foam. Furthermore, the seat foam is preferably arranged in the circumferential direction between the individual damping elements. The seat foam in this region can thus also be formed and arranged for additional damping in the Z-direction, that is, in the axial direction.

BRIEF DESCRIPTION OF THE DRAWINGS

The invention is explained in the following by way of example with reference to preferred embodiments.

They Show Schematically:

FIG. 1 shows a fan unit 100 for a vehicle seat 200 (not shown in FIG. 1). The fan unit 100 has an air duct tube 10 and a fan grille 11. An air duct is formed by the air duct tube 10. A receiving region 31 for a fan propeller (not shown in FIG. 1) is arranged within the air duct tube 10. To protect a fan propeller which is arrangeable within the air duct tube 10, the fan grille 11 is arranged above the first frontal opening 12 of the air duct tube 10.

Figure 1:
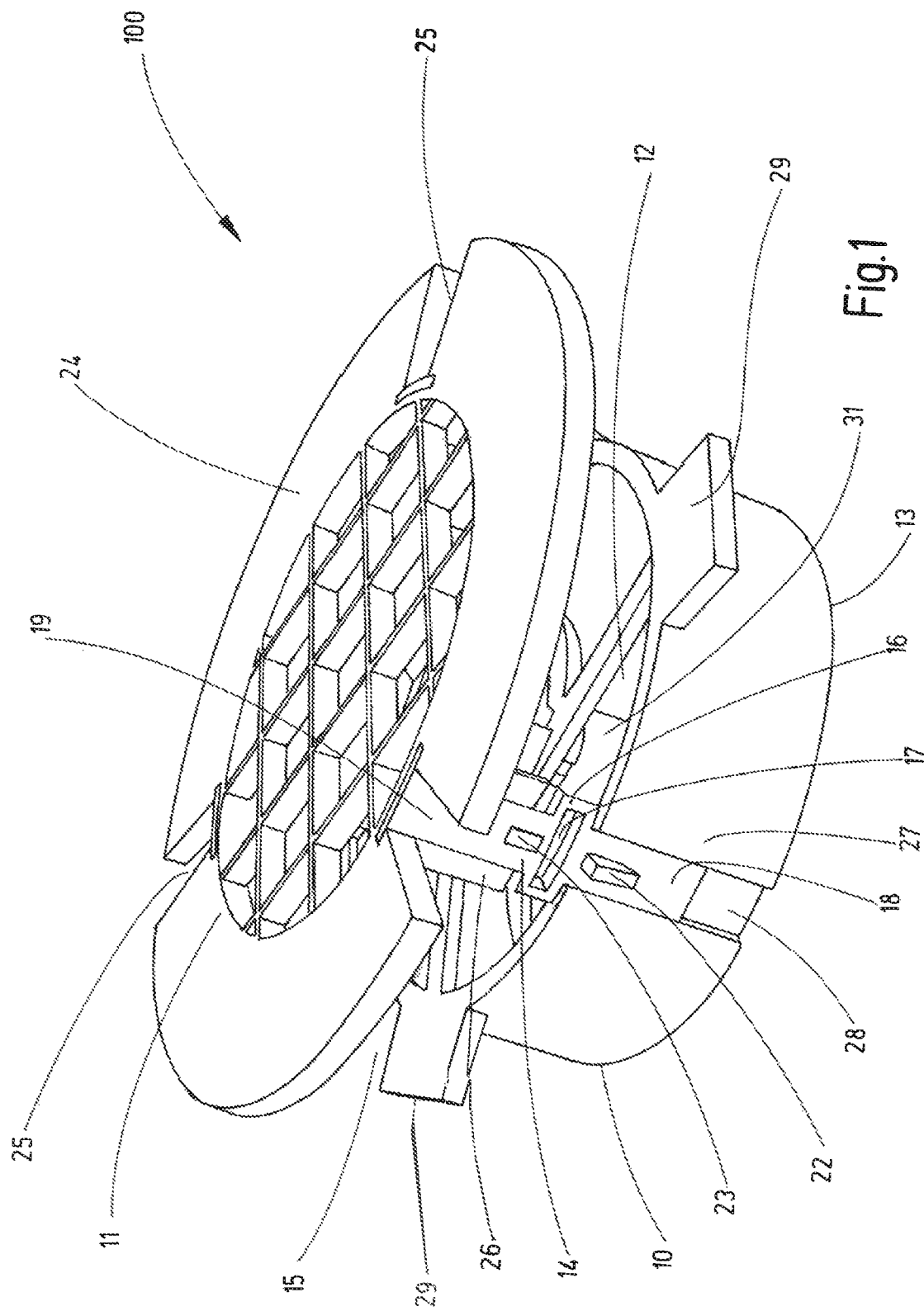
FIG. 1: a perspective view of a fan unit.

Damping elements 14 are arranged circumferentially distributed between the air duct tube 10 and the fan grille to reduce vibrations or for damping 11. The air duct tube 10 and the fan grille 11 are arranged spaced from each other such that a circumferential gap 15 is formed between the air duct tube 10 and the fan grille 11.

The damping elements 14 consist of an elastic homogeneous material. In the middle region, the damping elements 14 have sections 16 with a spring effect. This is achieved in that this section 16 is provided with a through hole 17 which is wider than the two sections 18, 19 adjoining the middle region. The first section 18 of the damping element 14 is arranged in a groove 28 on the outer side 27 of the air duct tube 10. With the second section 19, the damping element 14 is arranged on a grille leg 26 of the air grille 11.

The fan unit 100 can be inserted into a seat foam 210 (not shown in FIG. 1) of a vehicle seat 200 (not shown in FIG. 1). For this purpose, first the air duct tube 10 can be inserted together with the damping elements 14. Each damping element 14 has a first receiving means 20 in the form of a through hole for receiving a first locking pin 22. The first locking pin 22 is formed hook-shaped and projects radially from the outer side 27 or outer circumferential side of the air duct tube 10. When the air duct tube 10 is inserted into the seat foam 210, the air duct tube 10 hooks in the seat foam 210. The air duct tube 10 bears on the seat foam 210 with the flanges 29 projecting radially outwardly. The air duct tube 10 can also be fixed in the seat foam 210 by the first locking pins 22, which are formed hook-shaped.

Subsequently, the fan grille 11 can be inserted and be connected to the air duct tube 10 above the damping elements 14. For this purpose, each damping element 14 has a second receiving means 21 in the form of a through hole in the region of its second section 19. A second locking pin 23, which is arranged on the grille leg 26 of the fan grille 11, can be plugged into the second receiving means 21 formed as a through hole (or snaps into it), so that the fan grille 11 is connected to the air duct tube 10 above the damping elements 14 and the fan grille 11 is simultaneously locked.

The second locking pins 23 are formed cuboid and not hook-shaped. The fan grille 11 is thus taken out in a simpler manner. Due to the cuboid-shaped second locking pin 23, the fan grille 11 does not catch its second locking pin 23 in the seat foam 210. The fan grille 11 has a peripheral edge 24 with three radial recesses 25. The damping elements 14 are inserted into the radial recesses 25.

Figure 2:
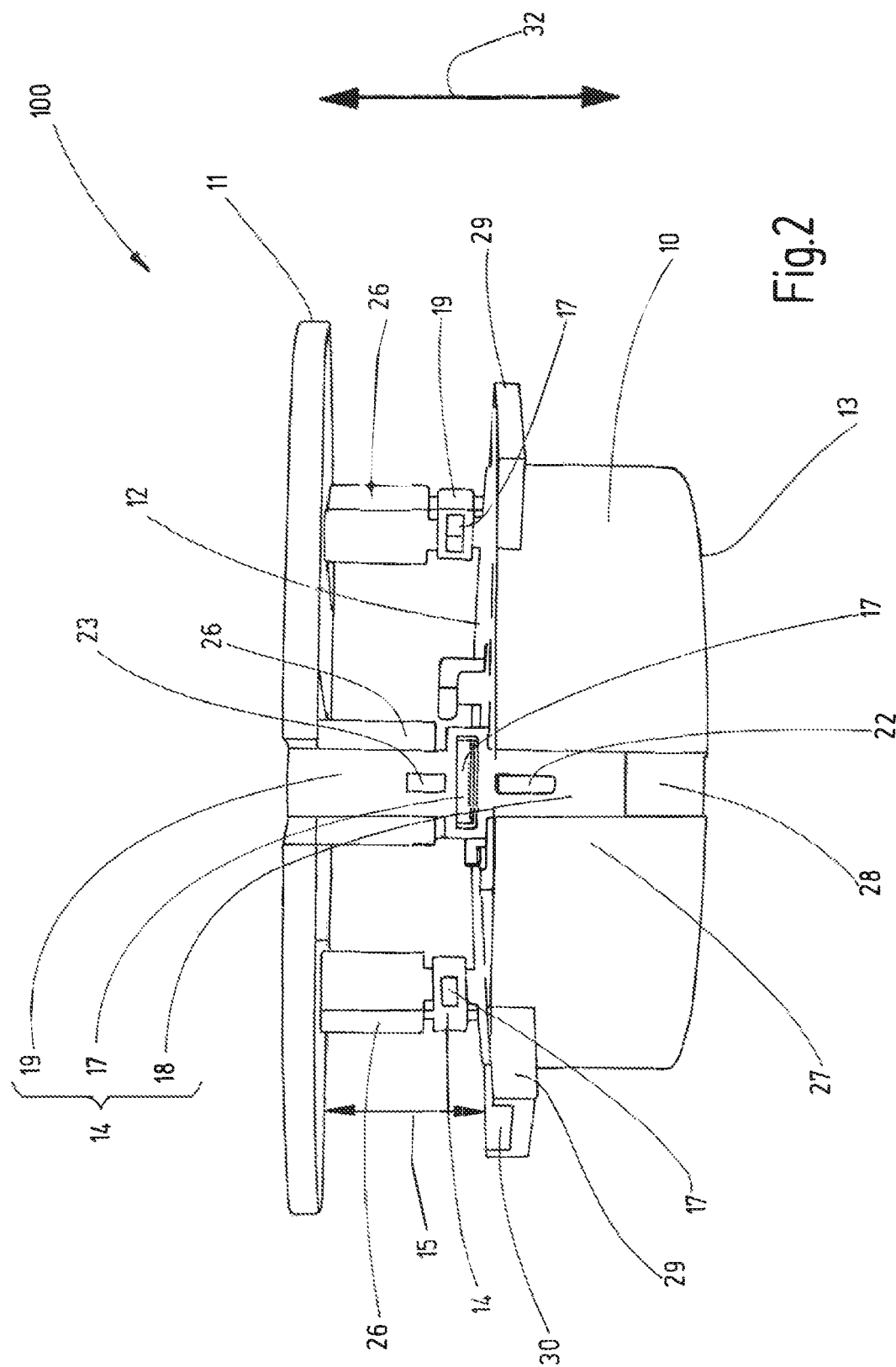
FIG. 2: a side view of a fan unit.

FIG. 2 shows a side view of the fan unit 100 of FIG. 1.

Figure 3:
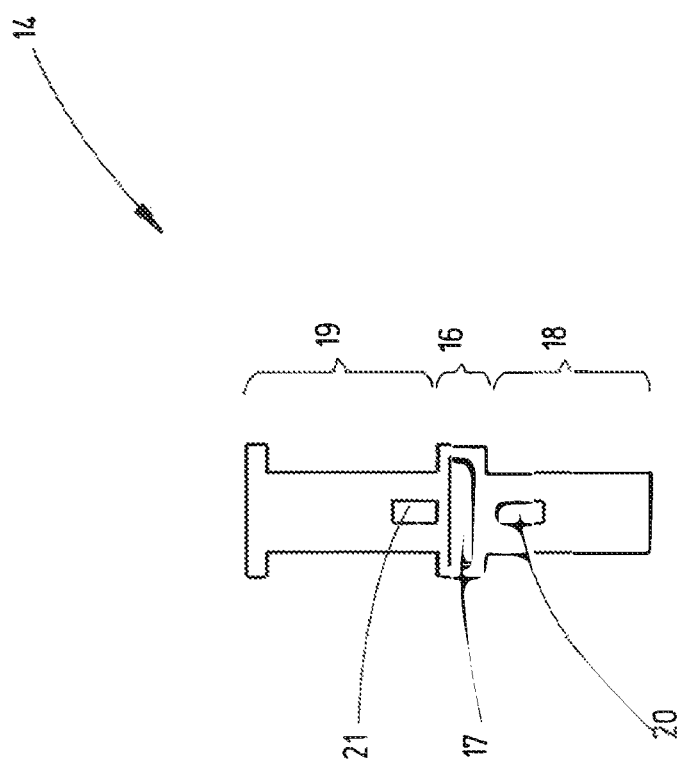
FIG. 3: a damping element.

A damping element 14 is shown in front view in FIG. 3. The damping element 14 consists essentially of three sections, a section 16 with spring effect, which is formed as a middle section, a first section 18 adjoining the middle section and a second section 19 adjoining the middle section on the opposite side.

The spring effect in the middle section is achieved by a larger through hole 17. The through hole 17 has a greater width than height. Furthermore, the through hole 17 has a greater width than the width of the first section and the second section in the respective adjacent region.

The damping element 14 has two receiving means 20, 21 to receive the locking pins 22, 23. Both receiving means are formed as through holes.

Figure 4:
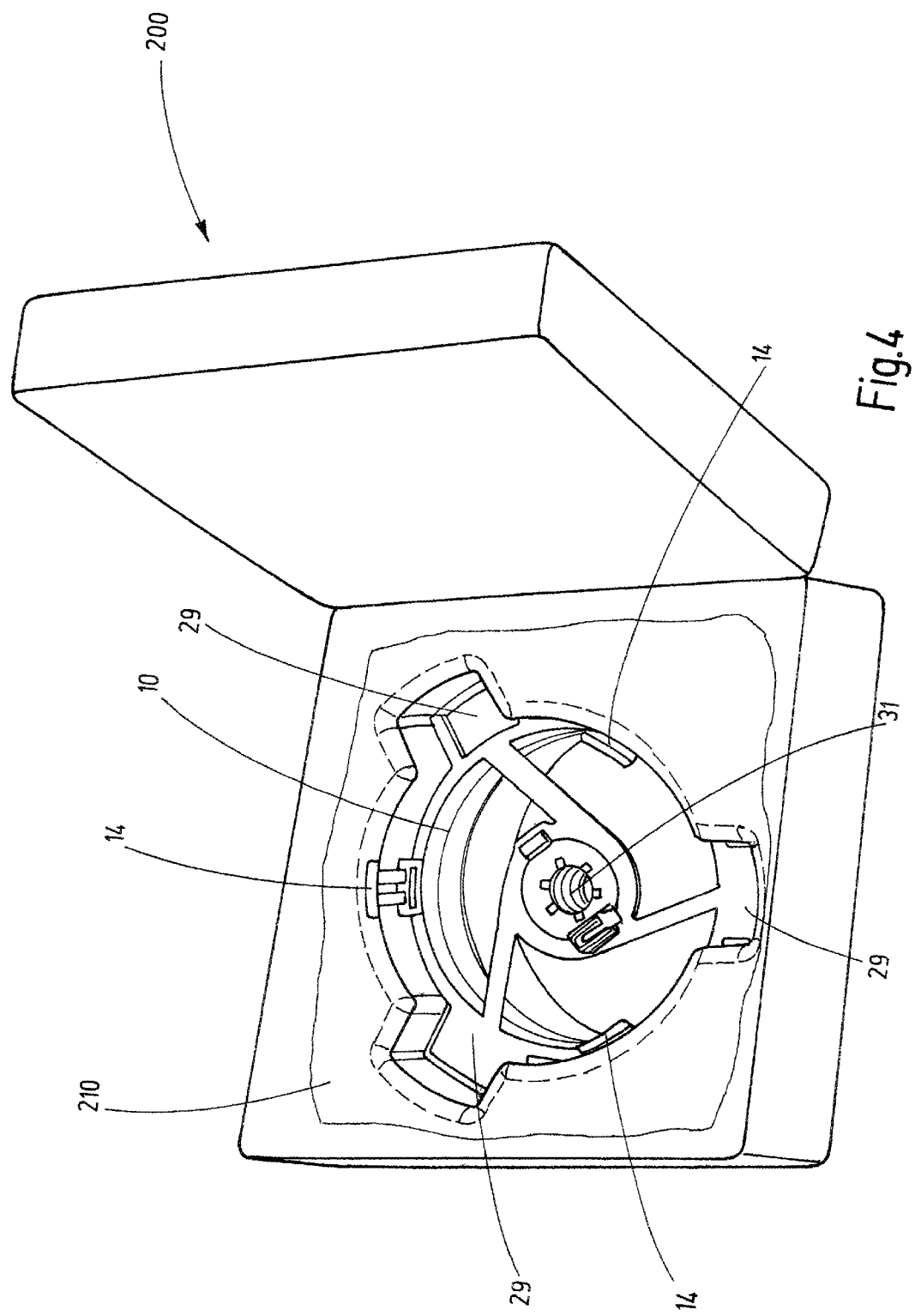
FIG. 4: a perspective view of a vehicle seat with a fan unit integrated therein.

FIG. 4 schematically shows a vehicle seat 200. A fan unit 100 is integrated into the seat foam 21 below the seat surface. The fan unit 100 is only partially shown in FIG. 4 for better clarity. FIG. 4 shows only the air duct tube 10 together with the damping elements 14. The fan grille 11 is not shown in FIG. 4. FIG. 4 thus schematically shows the vehicle seat 200 during the installation of the fan unit 100. In the first step, the air duct tube 10 together with the damping elements 14 are inserted into the seat foam 210. Due to the hook-shaped first locking means 20 and the flanges 19 projecting radially outwardly, the air duct tube 10 can be fixed within the seat foam 210. In the next step, the fan grille 11 can be placed in a simple manner and connected to the damping elements 14.

SUMMARY

In order to further improve a fan unit having an air duct tube and a fan grille, wherein an air duct is formed by the air duct tube and the fan grille is arranged above a first frontal opening of the air duct tube to protect a fan propeller which is arrangeable within the air duct tube, such that vibrations can be reduced in a simple and effective manner, at least three damping elements are arranged between the air duct tube and the fan grille to reduce vibrations.

The invention claimed is:

1. A fan unit, having an air duct tube and a fan grille, wherein an air duct is formed by the air duct tube, and the fan grille is arranged above a first frontal opening of the air duct tube to protect a fan propeller which is arrangeable within the air duct tube, characterized in that, at least three damping elements are arranged between the air duct tube and the fan grille for reducing vibrations;
wherein the damping elements have an elastic material or consist of an elastic material;
wherein each damping element has a section with a spring effect in at least the axial direction;
wherein a through hole is arranged through each damping element in the section with the spring effect;
wherein the spring effect in the section with the spring effect is achieved by the through hole;
wherein each damping element has a first plate-shaped or web-shaped section, the first plate-shaped or web-shaped section adjoining the section with the spring effect, and the first plate-shaped or web-shaped section having a smaller width than the section with the spring effect in an adjacent region;
wherein each damping element further has a second plate-shaped or web-shaped section arranged opposite to the first plate-shaped or web-shaped section, the second plate-shaped or web-shaped section adjoining the section with the spring effect, and the second plate-shaped or web-shaped section having a smaller width than the section with the spring effect in the adjacent region;
wherein at least one of the damping elements has a first receiving means for receiving a first locking pin and a second receiving means for receiving a second locking pin;
wherein the first locking pin is formed hook-shaped, and the second locking pin is formed block-shaped or cube-shaped; and
wherein the fan grille has an outer peripheral edge with radial recesses for receiving the damping elements.

2. The fan unit according to claim 1, characterized in that, each of the damping elements is formed separately and in one piece.

3. The fan unit according to claim 1, characterized in that, the damping elements are distributed circumferentially and arranged spaced from each other.

4. The fan unit according to claim 1, characterized in that, the fan grille is arranged spaced from the air duct tube in the axial direction to form an annular gap between the air duct tube and the fan grille.

5. The fan unit according to claim 4, characterized in that, the damping elements, at least in sections in the gap, are arranged between the air duct tube and the fan grille and divide the gap in the circumferential direction.

6. The fan unit according to claim 1, characterized in that, the fan grille has grille legs projecting in the axial direction.

7. The fan unit according to claim 1, characterized in that, a groove is arranged in an outer side of the air duct tube, wherein one of the damping elements is inserted in sections at least in regions in the groove.

8. The fan unit according to claim 1, characterized in that, the air duct tube has a plurality of flanges projecting radially outwardly.

9. A vehicle seat, characterized in that, the vehicle seat has at least one fan unit according to claim 1.

10. The vehicle seat according to claim 9, characterized in that, the fan unit is enclosed circumferentially by a seat foam within the vehicle seat.

11. The vehicle seat according to claim 10, characterized in that, the seat foam is additionally arranged between the air duct tube and the fan grille.

* * * * *